United States Patent [19]

Darden

[11] Patent Number: 4,485,025

[45] Date of Patent: Nov. 27, 1984

[54] POLYALKYLPOLYALKOXYPOLYSILOXANE STABILIZERS FOR INORGANIC SILICATES IN ANTIFREEZE/COOLANT FORMULATIONS

[75] Inventor: Jerome W. Darden, Austin, Tex.

[73] Assignee: Texaco Inc., White Plains, N.Y.

[21] Appl. No.: 513,590

[22] Filed: Jul. 14, 1983

[51] Int. Cl.$^3$ ................................................ C09K 5/00
[52] U.S. Cl. ...................................... 252/75; 252/78.3
[58] Field of Search ................................. 252/75, 78.3

[56] References Cited

U.S. PATENT DOCUMENTS

| | | | |
|---|---|---|---|
| 3,312,622 | 4/1967 | Pines et al. | 252/78.3 |
| 3,337,496 | 8/1967 | Pines et al. | 252/78.3 |
| 3,341,469 | 9/1967 | Pines et al. | 252/75 |
| 4,287,077 | 9/1981 | Wing | 252/75 |

Primary Examiner—Paul Lieberman
Assistant Examiner—Robert A. Wax
Attorney, Agent, or Firm—Jack H. Park; Kenneth R. Priem; David L. Mossman

[57] ABSTRACT

Gellation resistant aqueous glycol compositions containing an alkylene glycol, a corrosion inhibiting additive and an effective amount of an organo polysiloxane gellation resistant additive are described. Corrosion inhibiting additives tend to gel after some time in aqueous glycol solution, a phenomenon which is inhibited by 100 to 10,000 ppm of the polysiloxane additives of this invention. These polysiloxanes may have one or more substituents selected from the group of moieties of alkyl, alkoxy, cyano, diol ether, carboxylic acid, amide, aryl, alkaryl and acyl.

8 Claims, No Drawings

POLYALKYLPOLYALKOXYPOLYSILOXANE STABILIZERS FOR INORGANIC SILICATES IN ANTIFREEZE/COOLANT FORMULATIONS

BACKGROUND OF THE INVENTION

1. Field of the Invention

The invention relates to stabilizers for inorganic silicate corrosion inhibitors used in antifreeze/coolant formulations and particularly relates to such stabilizers which are organic polysiloxanes.

2. Related Stabilizers in the Field

Antifreeze compositions containing glycols and various corrosion inhibitors are well known in the prior art as is illustrated by U.S. Pat. Nos. 3,282,846 and 3,362,910. The use of the relatively inexpensive and effective borax and silicates in glycol formulations as corrosion inhibitors is well illustrated by these patents. It is conventional in this art to make a glycol concentrate which is then sold to end users for use as a coolant in automotive radiators and the like after dilution with water.

In the past, it has been found that glycol concentrates prepared using conventional corrosion inhibitors such as borax and silicates had a tendency to develop irreversible silicate gels upon standing for a period of time in a warehouse or store. The end user, when he attempted to pour the glycol concentrate into his automotive radiator, found that the concentrate had developed "slugs" or gels which either did not pour readily or which tumbled out in discrete masses along with the liquid. The present invention was developed to eliminate this gel formation.

In U.S. Pat. No. 4,149,985, there is disclosed that a gellation resistant glycol composition containing borate and silicate additives can be made wherein the order of addition of the additives and the pH of the solution is closely controlled in order to obtain the gellation resistant formulation.

In U.S. Pat. No. 3,312,622, there is disclosed a corrosion resistant glycol composition containing an organosilicon co-polymer having carboxylate salt groups and silicate groups.

Other organosiloxane compounds are known to help prevent the silicates from forming gels. See, for example, the compounds disclosed in U.S. Pat. Nos. 3,337,496 and 3,341,469. The problem with the organosiloxane compounds of these patents is that relatively large quantities are required before effective stabilization is achieved. Particularly pertinent to the present invention are the ether modified polymethyl oxygen-containing silicone polymers of U.S. Pat. No. 4,287,077 which are also taught as being good gellation resistant additives. Unfortunately, the organosiloxane materials of U.S. Pat. No. 4,287,077 must be synthesized using expensive platinum catalysts. A simpler, less expensive method of preparation is desired.

Many types of organosiloxane compounds are known in the art. For example, U.S. Pat. No. 2,846,458 describes organosiloxane compounds that have been modified with ethers, particularly the mono- and diethers of glycols and polyglycols. Such materials were then known to be useful as surface-active agents, release agents, lubricants, antifoam agents and as cosmetic additives. These compositions did not encompass polymers of silicon.

A method for making carbalkoxyalkyl polysiloxanes is revealed in U.S. Pat. No. 3,065,202. Such compounds were useful as plasticizers for organopolysiloxane resins and rubbers and as lubricants. U.S. Pat. No. 3,105,061 teaches a method for the preparation of diorganopolysiloxane polymers by the reaction of diacyloxysilanes and siloxanes with mono- and dihydroxy silanes and siloxanes.

The addition of SiH compounds to aliphatic unsaturated compounds in contact with chloroplatinic acid can be achieved in the presence of hydroxyl compounds such as water or alcohols according to U.S. Pat. No. 3,398,174. The organosilicon compounds made therein may contain either substituents.

Finally, various organosiloxane compounds having cyano-, ether, hydroxy- or phenylorgano modifying moieties are taught in U.S. Pat. No. 4,331,555 which teaches that such compounds are useful as foam stabilizers in flexible polyester polyurethane foam.

There remains a need for a gellation resistant stabilizer that allows smaller effective amounts to be used and which is less expensive than those currently used.

SUMMARY OF THE INVENTION

The invention concerns a gellation resistant aqueous glycol composition comprising 85 to 98 percent by weight of an alkylene glycol, an alkylene glycol ether or mixtures thereof, an effective amount to reduce corrosion of an inorganic alkali metal silicate and an effective amount to improve gellation resistance of a glycol soluble organosiloxane polymer having the formula

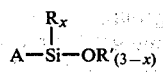

where A may be represented by the formula

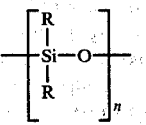

R is alkyl, alkoxy or a solubilizing moiety selected from the group consisting of a cyano-terminated moiety, a diol ether moiety, a carboxylic acid moiety and an amide moiety; R' is an alkyl, aryl, alkaryl or acyl group, x is an integer from zero to three and n ranges from one to five.

DETAILED DESCRIPTION OF THE PREFERRED EMBODIMENTS

The glycols and glycol ethers which can be used as major components in the present composition include glycols, such as ethylene glycol, diethylene glycol, propylene glycol and dipropylene glycol and glycol monoethers such as the methyl, ethyl, propyl and butyl ether of ethylene glycol, diethylene glycol, propylene glycol and dipropylene glycol. Also useful are glycol diethers such as the methyl and ethyl diethers or ethylene glycol, diethylene glycol and dipropylene glycol. Ethylene glycol is particularly preferred as the major antifreeze composition component.

A number of known corrosion inhibitors and additives can be used in the present invention. The most preferred corrosion inhibitors are the alkali metal silicates, such as sodium metasilicate, potassium metasilicate and lithium metasilicate. Also preferred are the silicates represented by the formula $[M_{1/a}O]_b SiO_{(4-b)/2}$ where M is a cation that forms a water soluble silicate, a is the valence of the cation represented by M and b has a value from 1 to 3, inclusive. This definition is used in U.S. Pat. Nos. 3,337,496 and 3,312,622.

Other corrosion inhibitors and additives may be used, such as alkali metal borates which include sodium tetraborate, potassium tetraborate, sodium metaborate and potassium metaborate. Other permissible components include alkali metal mercaptobenzotriazoles, alkali metal tolyltriazoles, alkali metal nitrates such as sodium nitrate and potassium nitrate, alkali metal nitrites such as potassium and sodium nitrite, alkali metal phosphates such as sodium phosphate and potassium phosphate, alkali metal benzoates and various antifoaming agents and dyes, if desired.

The stabilizer useful in this invention may be represented by the following formula

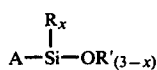

where A, in turn, may be represented by the formula

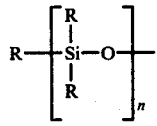

R is alkyl, alkoxy or a solubilizing group, R' is an alkyl, aryl, alkaryl or acyl group, x is an integer from zero to three and n ranges from one to five. Further, R may possess from one to twenty carbon atoms, and R' may have from one to four carbon atoms. The solubilizing group may be a cyanoterminated moiety, a diol ether moiety, a carboxylic acid moiety or an amide moiety. Included in the definition of R is any moiety which would yield a diol moiety upon hydrolysis. Particular examples of appropriate solubilizing groups include, but are not limited to, cyanopropyl, 3-propoxy-1,2-propane diol, propoxy malonic acid and propoxy-2,3-epoxy propane. This definition includes various polyalkylpolyalkoxypolysiloxanes as 1,3-dimethyl tetramethoxydisiloxane and 1,1,3,3-tetramethyl-1,3-diethoxydisiloxane. As will be shown, monosiloxane counterparts to these compounds are not effective gel inhibitors.

The effective polysiloxane compounds used in the present invention may be obtained from hydrolysis and subsequent condensation of simple organosiloxanes. Thus, the preparation of the gel inhibitors used herein avoids the need for a synthesis technique using expensive platinum catalysts as taught by U.S. Pat. No. 4,287,077.

The amounts of corrosion inhibitors discussed above known to be effective are well known in the art. Of course, the amount will vary for each inhibitor. It is not possible to set forth exactly the amount of silicate to be used in each instance due to the complicating influence of the other corrosion inhibitors such as the aforementioned borates, triazoles, nitrates, nitrites and phosphates. Simple, accelerated aging tests can be used to determine the amount of silicate which when added will give the desired corrosion resistance. Generally, the proportion of silicates should range from about 0.025 to 1.0 percent by weight, preferably about 0.05 to 0.5 percent by weight. See, for example, U.S. Pat. Nos. 3,312,622 and 3,341,469.

The gellation resistant organosiloxane polymer should be used at levels of about 100 to 10,000 ppm to prevent gellation of the inorganic silicates in antifreeze/coolant formulations. These limits are much lower than those found in much of the prior art.

Throughout this specification it is noted that the gellation inhibitor is first created and subsequently added to the alkylene glycol composition. However, an alternate approach, which may even turn out to be the preferred one in practice, is to form the gellation inhibitor in situ. The invention relates to a glycol composition containing these gellation inhibitors and is not restricted by the method by which this is accomplished.

The method of this invention will be further illustrated by the following examples which are not intended to limit the invention, but rather to illuminate it.

EXAMPLE I 1,3-dimethyltetramethoxydisiloxane (Additive A), was added at a level of 200 ppm to an antifreeze concentrate consisting of ethylene gylcol, $NaNO_3$, tolyltriazole, and 0.3 wt.% $Na_2SiO_3.5H_2O$. Additive A was also added to a coolant composition at 200 ppm consisting of 50 wt.% antifreeze concentrate and 50 wt.% $H_2O$. Both samples were placed in a storage stability test. The storage stability of an antifreeze or coolant is determined by placing about 100 g of the antifreeze or coolant in an oven at 150° F. One day's storage at 150° F. is equivalent to approximately one month at room temperature; thus, this test is a measure of the shelf life of the antifreeze concentrate or coolant.

The antifreeze concentrate showed no signs of gel after fourteen days, equivalent to a shelf life of greater than fourteen months, when stabilized with Additive A at 200 ppm. The coolant composition showed no signs of gel after thirty days, equivalent to a shelf life of greater than thirty months, when stabilized with Additive A at 200 ppm.

EXAMPLE II

Unstabilized Antifreeze/Coolant Compositions

The same antifreeze concentrate used in Example I was placed in the storage stability test. This sample was not stabilized with Additive A. The antifreeze concentrate showed gel formation after seven days; thus, the use of Additive A effectively doubled the shelf life of said antifreeze concentrate. The coolant composition used in Example I was prepared, except no Additive A was added. The coolant composition, unstabilized, showed signs of gel formation after eleven days at 150° F. The use of Additive A approximately tripled the shelf life of said coolant composition.

EXAMPLE III

The antifreeze concentrate prepared in Example I was stabilized with 100 ppm of Additive A, and placed in the storage stability test at 150° F. The stabilized antifreeze concentrate showed no signs of gel formation after fourteen days, equivalent to a shelf life of greater than fourteen months.

EXAMPLE IV

The antifreeze concentrate prepared in Example III was placed in the storage stability test at 150° F. No Additive A was added. The unstabilized antifreeze concentrate exhibited gel formation after six days at 150° F., equivalent to a shelf life of six months. Thus, the addition of 100 ppm of Additive A more than doubled the shelf life of the antifreeze concentrate.

EXAMPLE V

Additive B (1,1,3,3-tetramethyl-1,3-diethoxydisiloxane) was added to the antifreeze concentrate prepared in Example III at a level of 1000 ppm. The sample was placed in the storage stability test. The stabilized antifreeze concentrate showed no signs of gel formation after fourteen days at 150° F., equivalent to a shelf life of greater than fourteen months.

Unstabilized antifreeze concentrate showed gel formation after six days at 150° F. Thus, addition of 1000 ppm of Additive B more than doubled the shelf life of this antifreeze concentrate.

EXAMPLE VI

Methyltrimethoxysilane (Additive C) was added to the antifreeze concentrate prepared in Example I at a level of 200 ppm. The sample was placed in the storage stability test at 150° F. The sample exhibited gel formation after only seven days at 150° F. Unstabilized antifreeze concentrate exhibited gel formation after seven days. Thus, the addition of methyltrimethoxysilane at this level gave no improvement over unstabilized antifreeze concentrate.

It is surprising that 1,3-dimethyltetramethyloxydisiloxane stabilizes antifreeze/coolants at a level of 100 ppm, or 0.08 mmol of Si (Example III), when methyltrimethoxysilane fails to stabilize antifreeze/coolants at 200 ppm, or 0.15 mmol Si, about twice the silicon level of the disiloxane. If the disiloxane were acting as a dimer of methyltrimethoxysilane, it could be expected that this level of silane would have stabilized these antifreeze/coolants. Thus, it is concluded that these disiloxanes are not merely operating as dimers of the ineffective monomers.

These stabilizers have been shown to prevent gellation of inorganic silicates which are used as corrosion inhibitors in antifreeze/coolant compositions, thus improving the shelf life of said compositions. Many modifications may be made in the compositions of this invention by those skilled in the art without departing from the spirit and scope of the invention which is defined only in the appended claims. For example, one might find that a particular polysiloxane or combination of polysiloxanes or proportions thereof may be especially effective in the prevention of gel formation caused by corrosion inhibitors.

I claim:

1. A gellation resistant aqueous glycol composition comprising
   (a) 85 to 98 percent by weight of an alkylene glycol, an alkylene glycol ether or mixtures thereof,
   (b) an effective amount to reduce corrosion of an inorganic alkali metal silicate, and
   (c) an effective amount to improve gellation resistance of a glycol soluble organosiloxane polymer selected from the group consisting of 1,3-dimethyltetramethoxy-siloxane and 1,1,3,3-tetramethyl-1,3-diethoxydisiloxane.

2. The composition of claim 1 in which the alkylene glycol is ethylene glycol.

3. The composition of claim 1 in which the remainder of the composition is water and an effective amount of one or more other corrosion inhibitors.

4. The composition of claim 1 in which the amount of organosiloxane polymer ranges from about 100 to 10,000 ppm based on the total composition.

5. A method for improving the gellation resistance of a corrosion inhibited aqueous glycol composition comprising adding to
   (a) a glycol composition comprising 85 to 95 percent by weight of an alkylene glycol, an alkylene glycol ether or mixtures thereof and an effective amount to reduce corrosin of an inorganic alkali metal silicate,
   (b) an effective amount of a glycol soluble organosiloxane polymer additive selected from the group onsisting of 1,3-dimethyltetramethoxysiloxane and 1,1,3,3-tetramethyl-1,3-diethoxydisiloxane.

6. The method of claim 5 in which the alkylene glycol is ethylene glycol.

7. The method of claim 5 in which the remainder of the composition is water and an effective amount of one or more other corrosion inhibitors.

8. The method of claim 5 in which the amount of organosiloxane polymer ranges from about 100 to 10,000 ppm based on the total composition.

* * * * *